(12) United States Patent
Sabadie et al.

(10) Patent No.: US 8,622,348 B2
(45) Date of Patent: Jan. 7, 2014

(54) FIXATION MECHANISM FOR INSTALLING THERMAL INSULATION SHEETS IN AN AIRCRAFT BODY

(75) Inventors: Lionel Sabadie, Toulouse (FR); Guillaume Courtin, Toulouse (FR); Gilles Andrieu, Beauzelle (FR); Marc Tomasi, Toulouse (FR); Didier Reynes, Toulouse (FR); Christian Banis, Leguevin (FR); Jean-Claude Briois, Plaisance du Touch (FR)

(73) Assignee: Airbus Operations S.A.S., Toulouse (FR)

( * ) Notice: Subject to any disclaimer, the term of this patent is extended or adjusted under 35 U.S.C. 154(b) by 150 days.

(21) Appl. No.: 13/165,446

(22) Filed: Jun. 21, 2011

(65) Prior Publication Data
US 2011/0315823 A1     Dec. 29, 2011

(30) Foreign Application Priority Data
Jun. 22, 2010  (FR) .................................... 10 02610

(51) Int. Cl.
*B64C 1/06*         (2006.01)

(52) U.S. Cl.
USPC ...... 244/131; 244/117 R; 244/119; 244/129.1

(58) Field of Classification Search
USPC ........... 244/117 R, 119, 121, 129.1, 131, 132
See application file for complete search history.

(56) References Cited

U.S. PATENT DOCUMENTS

| | | | |
|---|---|---|---|
| 3,938,764 A * | 2/1976 | McIntyre et al. | 244/117 R |
| 4,906,155 A | 3/1990 | Balza | |
| 5,263,665 A | 11/1993 | Koneczny et al. | |
| 5,915,652 A * | 6/1999 | Caldwell et al. | 244/121 |
| 2005/0082431 A1 | 4/2005 | Scown et al. | |
| 2009/0159750 A1 | 6/2009 | Sayilgan et al. | |

FOREIGN PATENT DOCUMENTS

| | | |
|---|---|---|
| EP | 0 320 377 A1 | 6/1989 |
| EP | 0 561 107 A1 | 9/1993 |
| GB | 1049510 | 11/1966 |

OTHER PUBLICATIONS

U.S. Appl. No. 13/165,115, filed Jun. 21, 2011, Sabadie, et al.
U.S. Appl. No. 13/165,150, filed Jun. 21, 2011, Sabadie, et al.
U.S. Appl. No. 13/165,108, filed Jun. 21, 2011, Holvoet, et al.
U.S. Appl. No. 13/165,461, filed Jun. 21, 2011, Holvoet, et al.
French Preliminary Search Report issued on Mar. 2, 2011 in corresponding French Application No. 10 02610 filed on Jun. 22, 2010 (with an English Translation of Categories).

* cited by examiner

*Primary Examiner* — Philip J Bonzell
*Assistant Examiner* — Nicholas McFall
(74) *Attorney, Agent, or Firm* — Oblon, Spivak, McClelland, Maier & Neustadt, L.L.P.

(57) ABSTRACT

The invention relates to a device for holding an insulating blanket and for fastening systems in an aircraft, comprising a base having two ends from each of which an arm extends.

Figure 1:
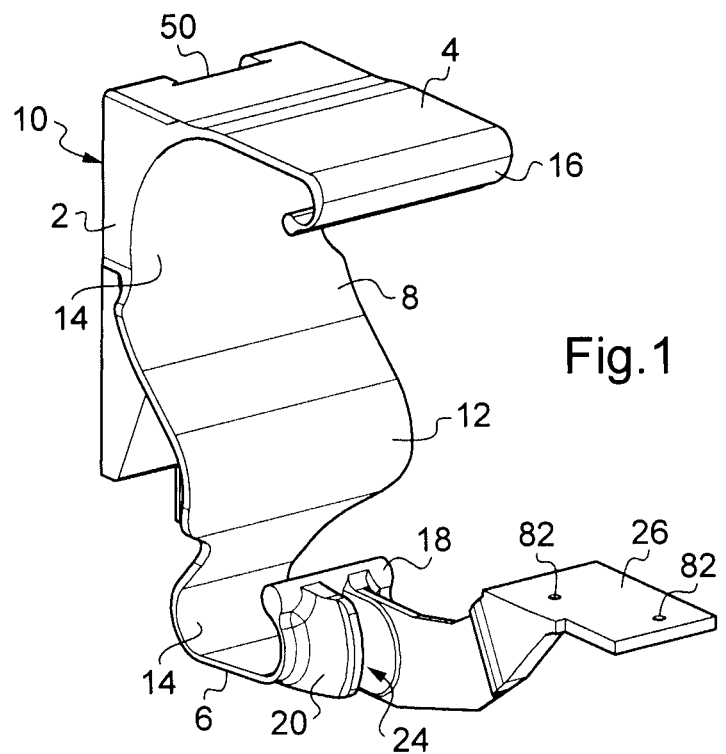

At least one arm has a U-shaped part having two more or less parallel branches, and in that the said device further comprises at least one support for accommodating a system.

The invention also relates to an aircraft fuselage section comprising frames, an outer skin, stabilizers and at least one insulating blanket. This section comprises at least one holding device such as described above, mounted so that a frame is situated between the arms of the holding device so that the blanket is between the frame and the holding device.

16 Claims, 9 Drawing Sheets

Fig.5
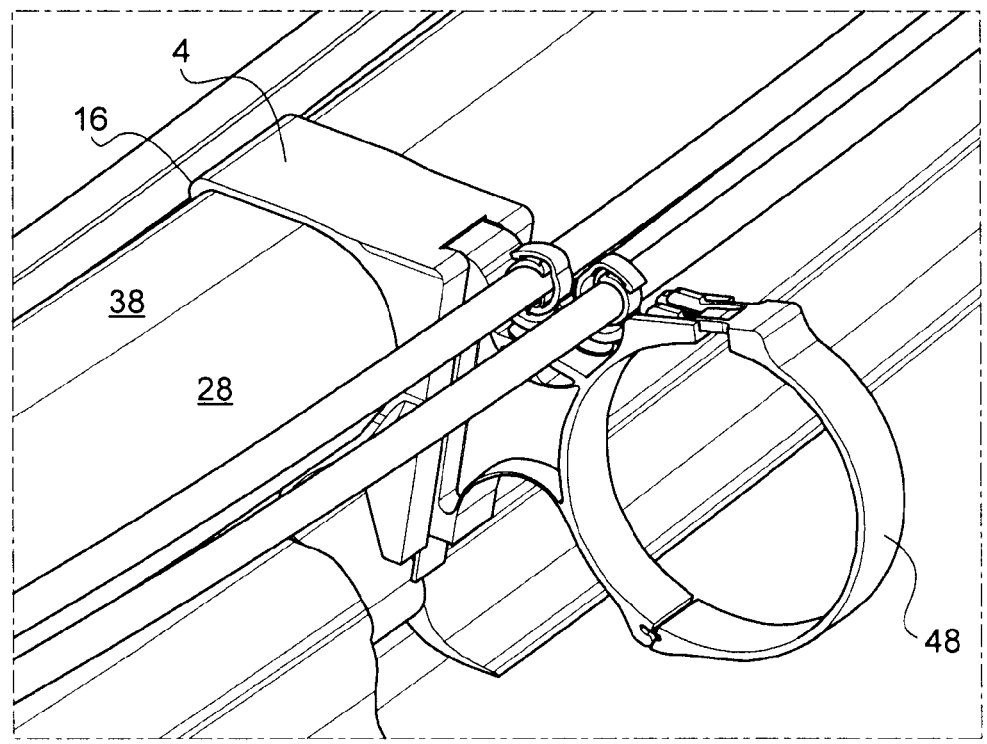
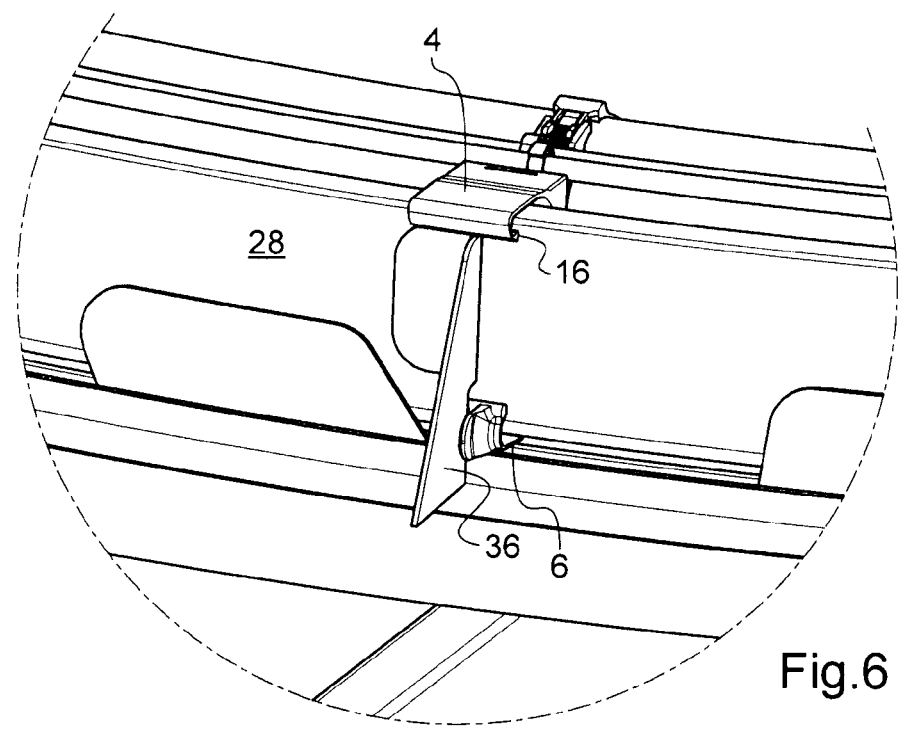
Fig.6

Fig. 15
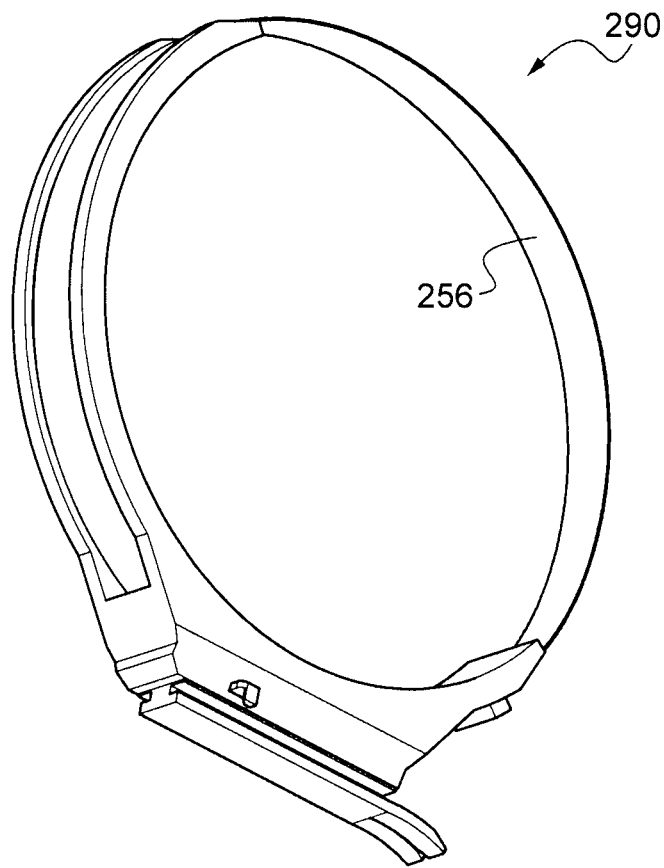
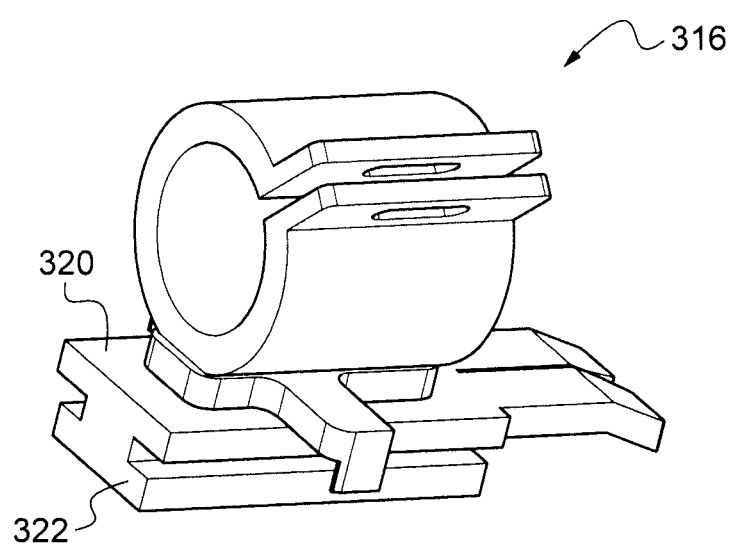
Fig. 16

FIXATION MECHANISM FOR INSTALLING THERMAL INSULATION SHEETS IN AN AIRCRAFT BODY

This invention relates to a device for holding an insulating blanket and for fastening systems. This invention relates to the aeronautical field and more particularly aircraft construction.

An aircraft fuselage usually has a structure made up of frames and stringers. The exterior shell of the fuselage is fastened onto the frames and stringers. When the aircraft is intended to fly at high altitude, considering the outside temperatures to which it is to be subjected, it is necessary to implement a thermal insulation of the fuselage. It then is known to cover the interior face of the skin forming the shell of the fuselage with insulating blankets in the form of flexible strips or panels. These blankets are called skin blankets. It also is advisable to thermally insulate each frame. There then are used blankets having a structure similar to that of the skin blankets, but the shape of which is adapted for coming to encase the frames inside the fuselage. These blankets hereinafter are called frame blankets.

The frames of the fuselage also serve as supports for various systems. By systems there is understood here equipment items of the aircraft as well as the electrical wirings, the hydraulic systems, the pneumatic systems, the air ducts for ventilation and pressurization inside the fuselage, . . . .

Holes then are made in the frames of the fuselage on the one hand to allow fastening of the insulating blankets and on the other hand to allow support and fastening of systems. These holes weaken the frames and sometimes must be compensated for by structural reinforcements, which thus complicates the design of the aircraft.

Moreover, as regards the blankets, it is advisable to adapt their shape to the various fastening devices provided. Holes, cut-outs, notches, . . . must be provided in the blankets to allow passage of a fastening device, fitting to the structure of the fuselage, . . . . The holes and notches made in the blankets degrade their insulating performance and are sources of thermal (and acoustic) bridges and they thus reduce the performances of the blankets.

It therefore is advisable at the same time to limit the number of holes made in the structure of the aircraft (frame and/or other structural part) as well as in the insulating blankets (skin blankets and frame blankets).

The document FR-2 933 376 thus shows, for example, a device for fastening an insulating blanket and a method for installing an insulating blanket in an aircraft fuselage making it possible to limit the number of holes to be made in the frames of the aircraft. The device described in this document comprises a portion forming a hook adapted for coming to cap a flank of the frame and grip the latter by itself or in cooperation with a structural element of the aircraft so as to ensure fastening of the device to the frame. One embodiment of this device comprises a first frame-blanket clip borne by a first member intended to extend on the first side of the frame, a second frame-blanket clip borne by a second member intended to extend on the second side of the frame, a first skin-blanket clip borne by the first member and a second skin-blanket clip borne by the second member.

This invention then has as a purpose to provide a system allowing on the one hand the holding of insulating blankets and on the other hand the support of systems while at the same time limiting the holes to be made in the structure of the aircraft (frame, . . . ) and on the other hand in the said insulating blankets.

Advantageously, the implementation of such a system will be easy and/or at a limited cost price and/or with a mass as small as possible.

For this purpose, this invention proposes a device for holding an insulating blanket and for fastening systems in an aircraft, comprising a base having two ends from each of which an arm extends.

According to this invention, at least one arm has a U-shaped part having two more or less parallel branches, and the said device further comprises at least one support for accommodating a system.

The structure comprising the base and the two arms makes it possible to mount the device on a frame and to hold an insulating blanket. As to the U-shaped part, it allows precise positioning of the device in relation to the structure on which the device is mounted by coming to cooperate with a structural element that comes to be accommodated between the branches of the U-shaped part. The latter may be either added onto the arm in question, or the arm itself may be U-shaped.

In a device according to this invention, it may be provided that the base of elongated shape defines a plane, referred to as reference plane, and that the arms extend more or less perpendicular to the said reference plane.

The device according to the invention may be such that the base of elongated shape, the arms and the U-shaped part form only a single part. Such an assembly then is elastic and its elastic deformation may be used for holding an insulating blanket in position on a frame.

For a greater adjustability and adaptability of the device according to this invention, at least one support advantageously is a separate part equipped with assembly means, and the base and/or at least one arm comprises complementary assembly means making it possible to accommodate the said support. In such an embodiment variant, the said assembly means and the said complementary assembly means preferably allow an assembly and a reversible locking by means of elastic deformation. In this way, there is no risk of unintentional dismantling of the support.

This invention also relates to an aircraft fuselage section, comprising frames, an outer skin fastened onto the frames with the aid of fastening parts called stabilizers, at least one insulating blanket, characterized in that an insulating blanket is fastened onto a frame with the aid of at least one device such as described above, so that the said frame is situated between the arms of the said device and the said insulating blanket is situated between the said frame and the said device.

In such an aircraft fuselage section, the branches of the U-shaped part are disposed, for example, on both sides of a wall of a stabilizer. In that way, an indexing of the position of the device in relation to the structure of the aircraft is achieved.

In order to achieve a better insulation, it may be provided that the same insulating blanket covers on the one hand a surface portion of the outer skin and on the other hand, at least partially, a frame section. In this case, a skin blanket also serves as a frame blanket and that makes it possible to avoid a connection between two insulating blankets.

In an aircraft fuselage section according to this invention, at least one insulating blanket may be connected to an adjoining insulating blanket with the aid of a hook-and-loop system, for example a connection system known under the trade name Velcro.

Finally, this invention also relates to an aircraft, characterized in that it comprises at least one fuselage section such as described above.

Figure 2:
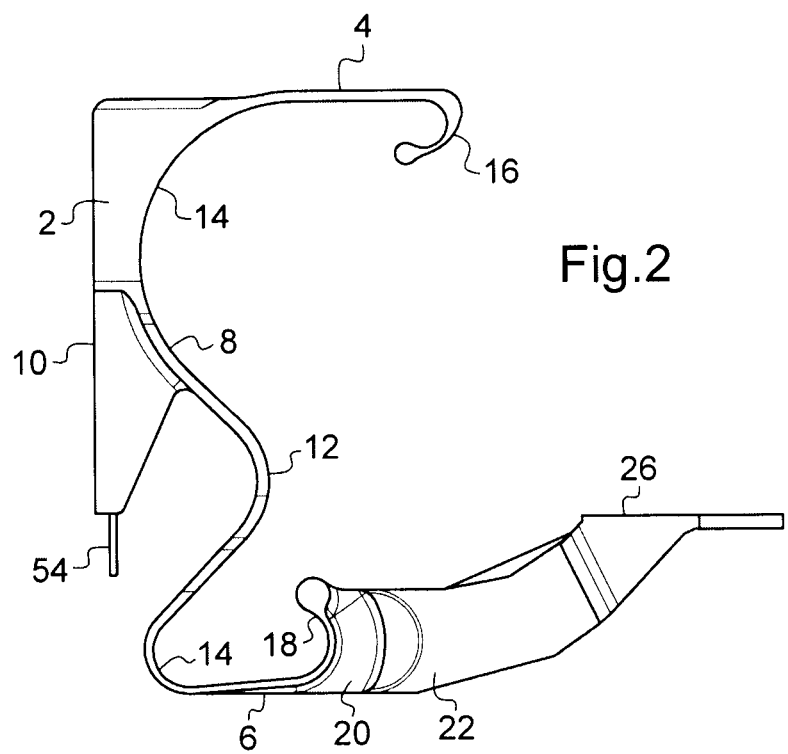
Figure 3:
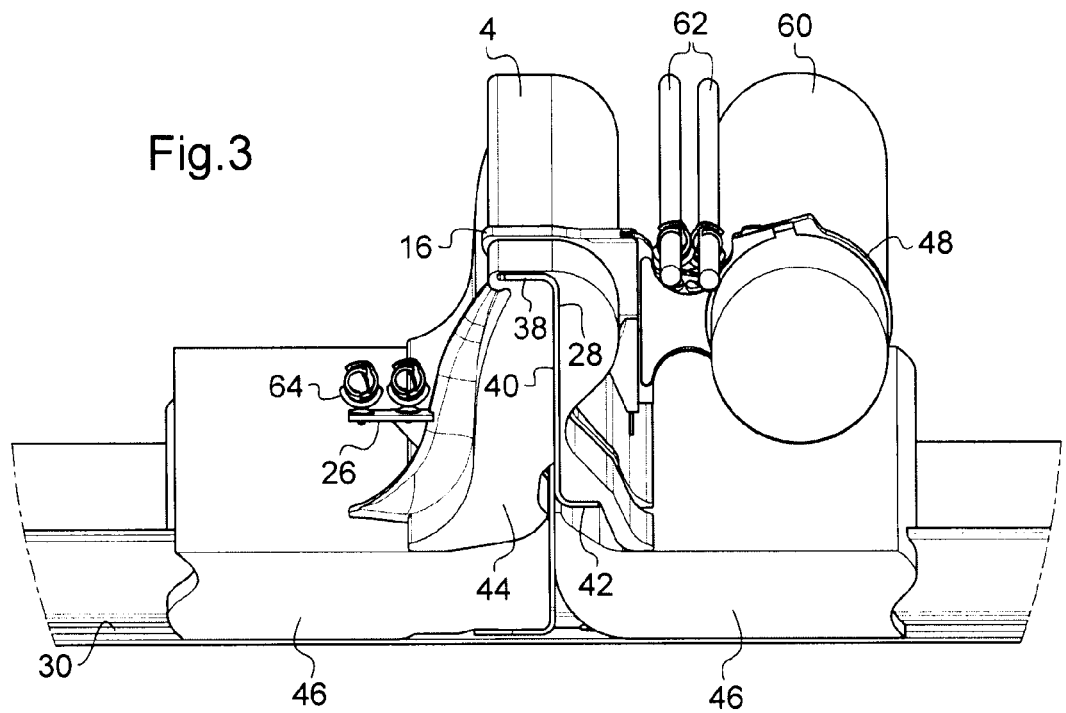
Figure 4:
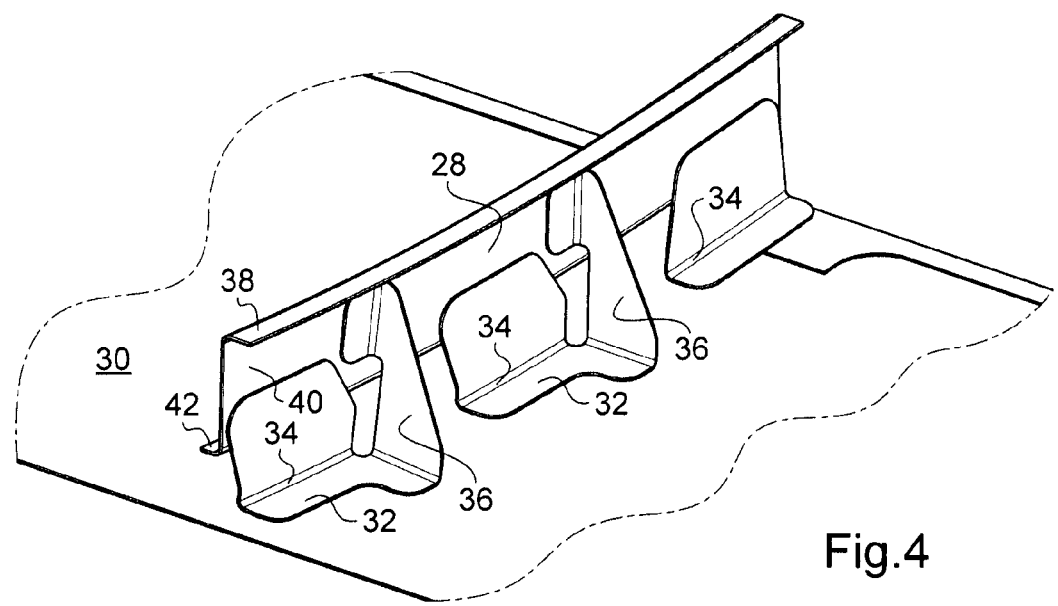
Figure 7:
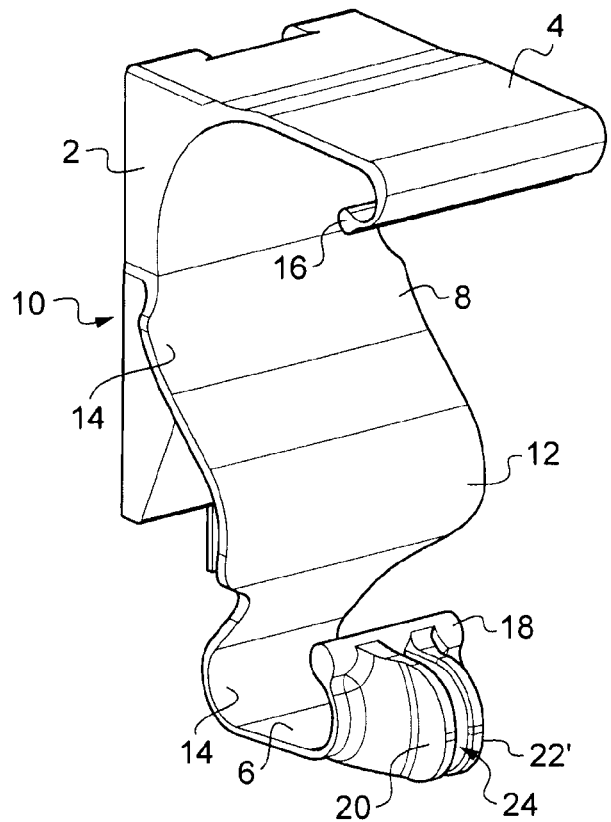
Figure 8:
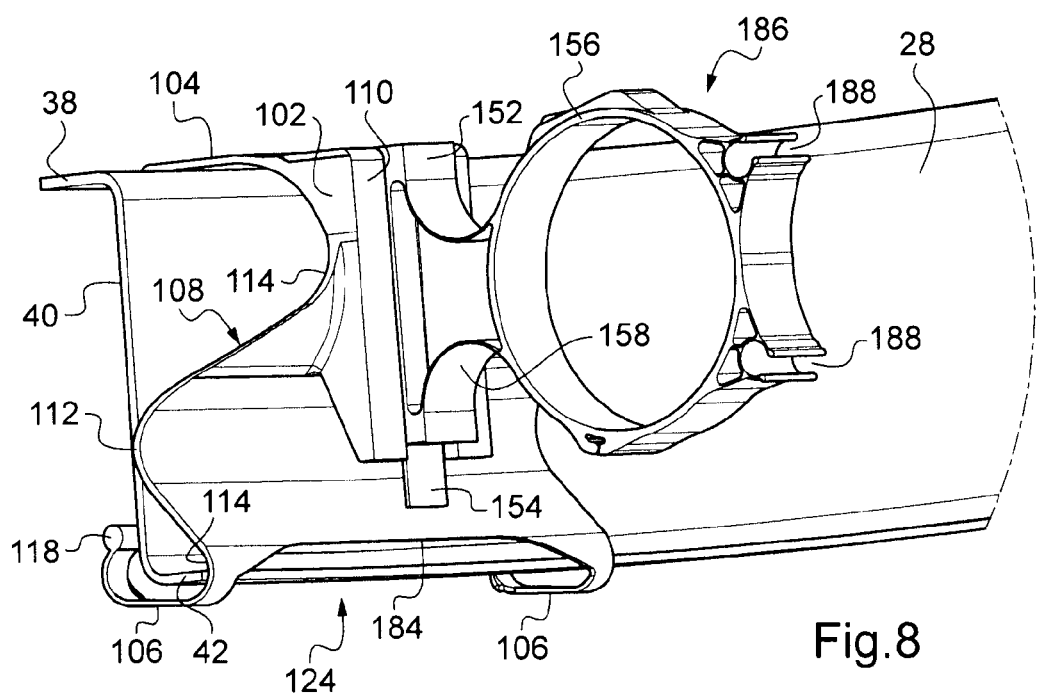
Figure 9:
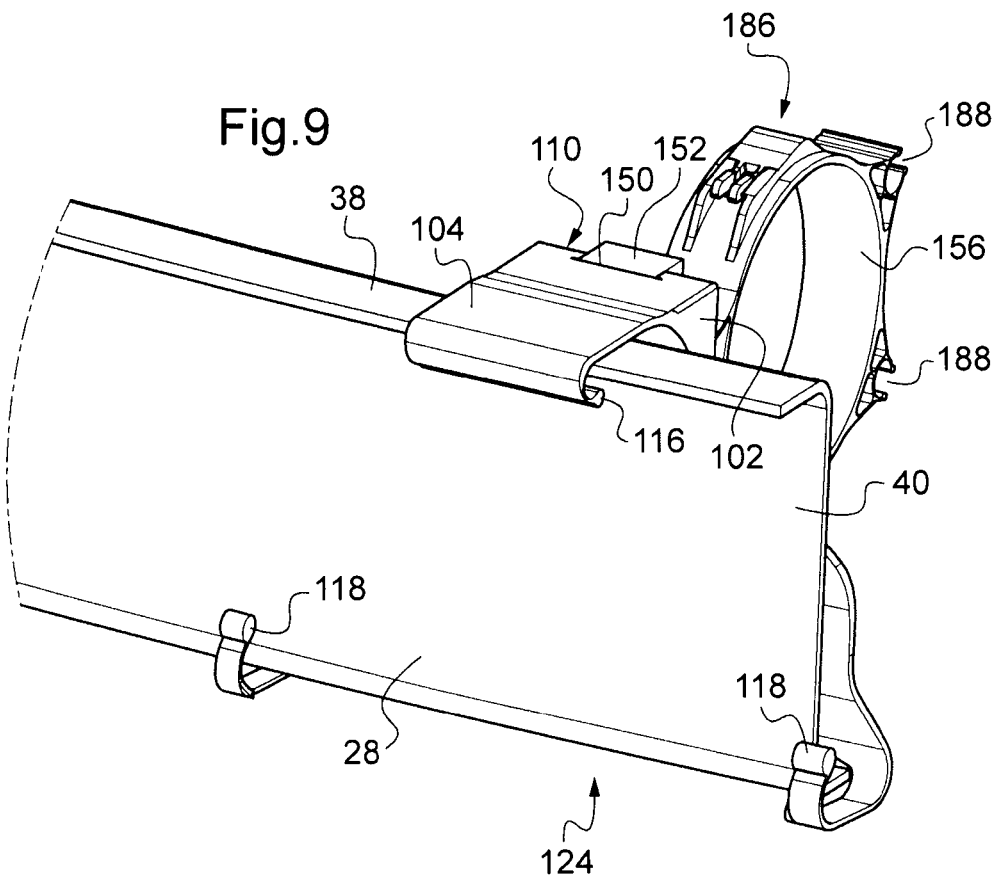
Figure 10:
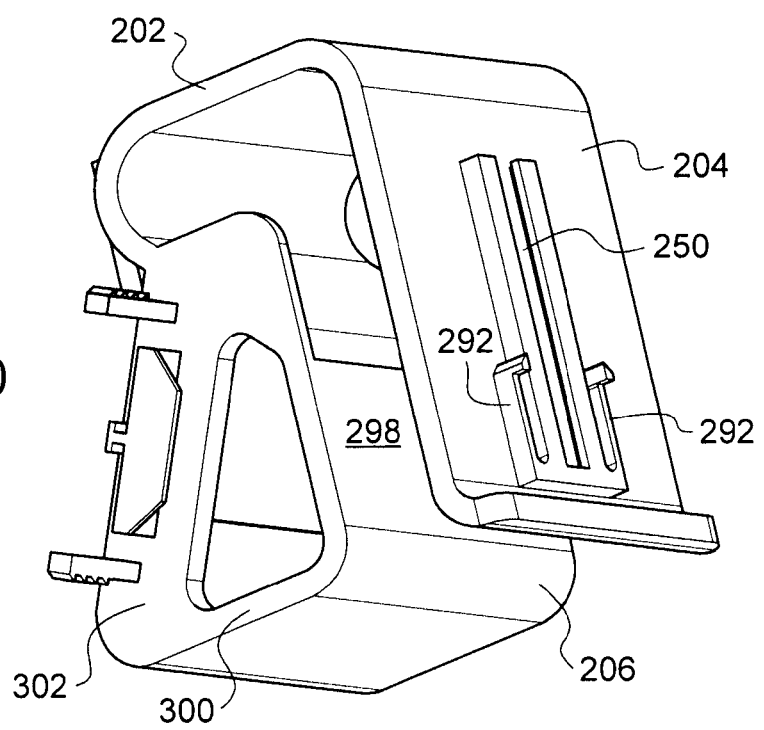
Figure 11:
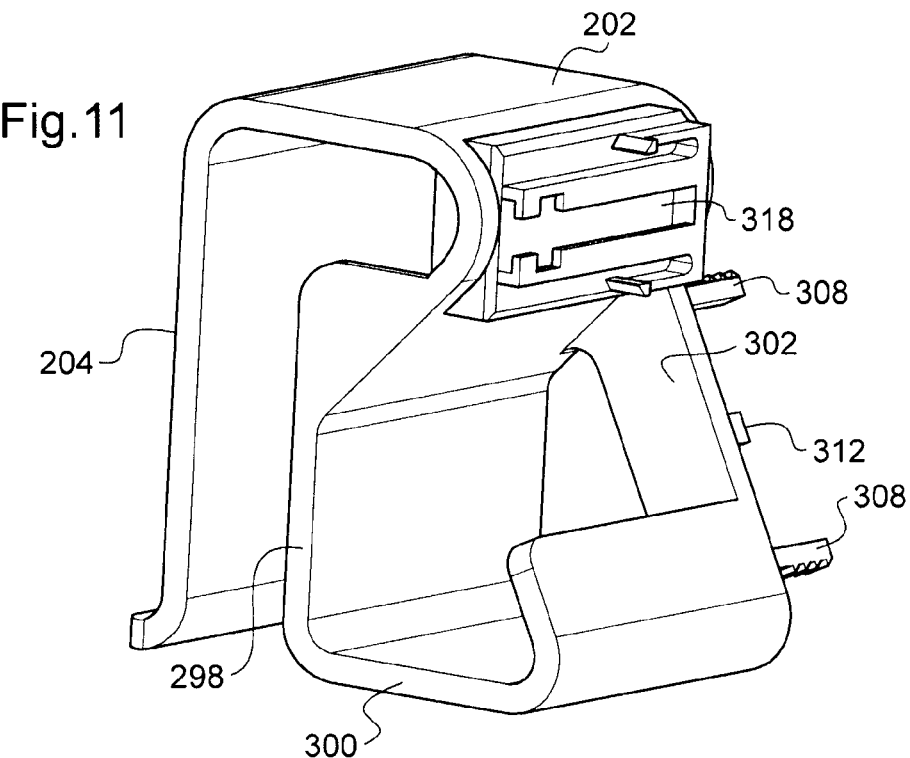
Figure 12:
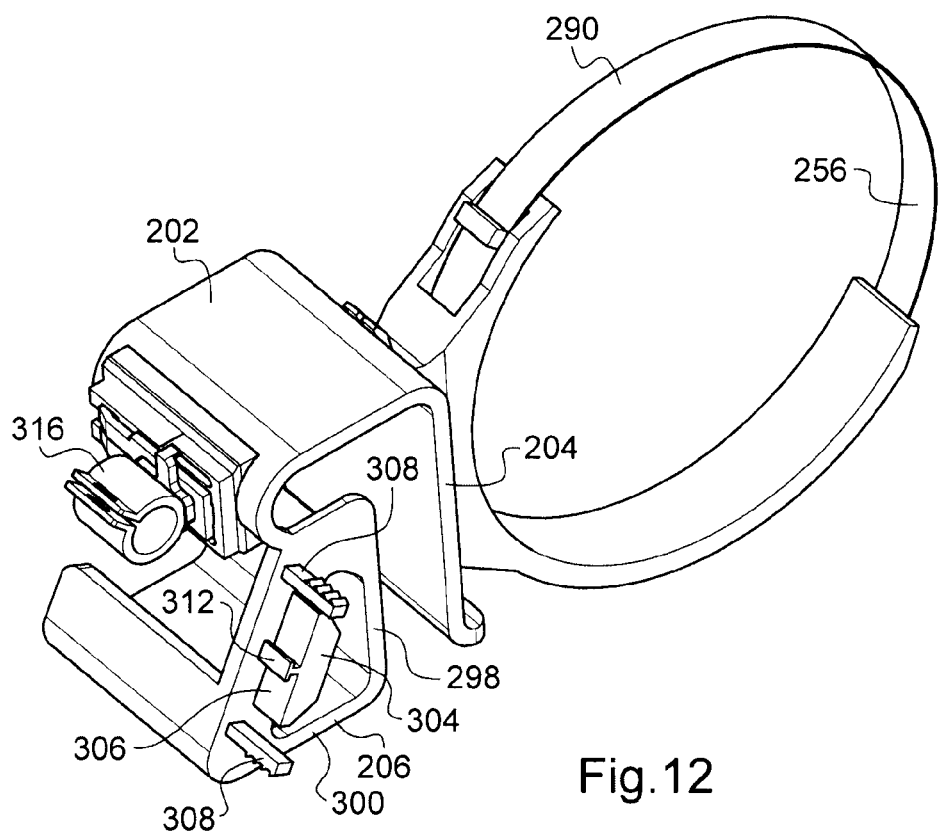
Figure 13:
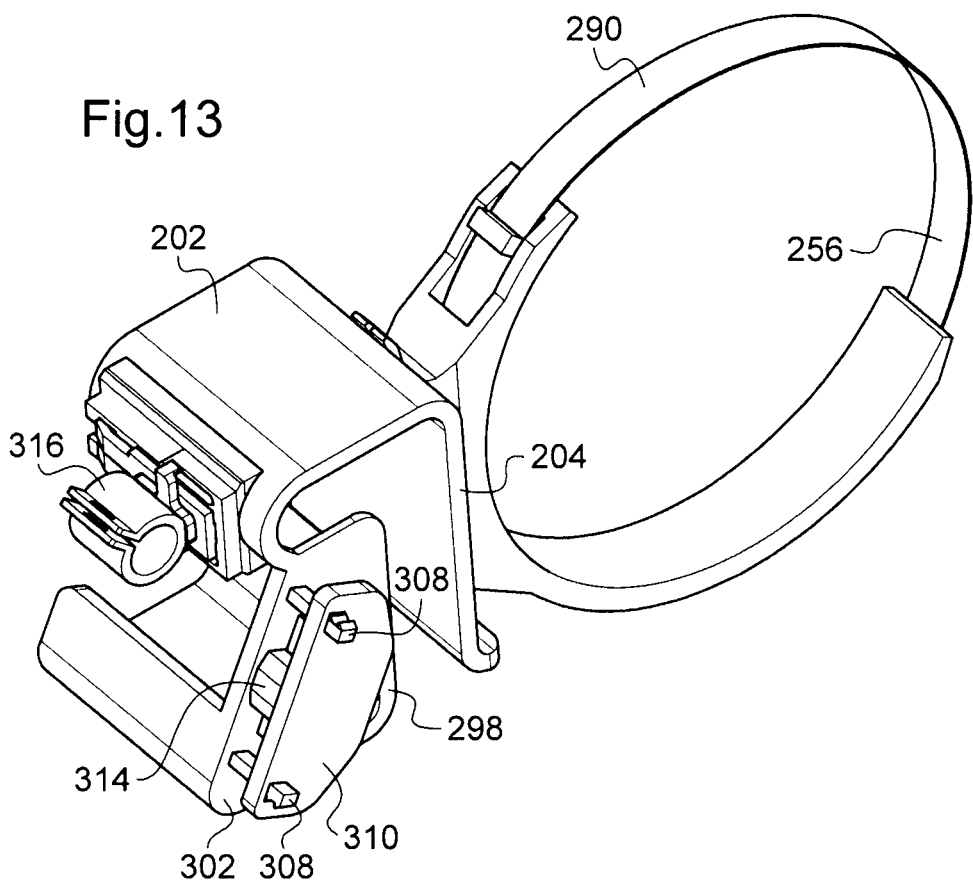
Figure 14:
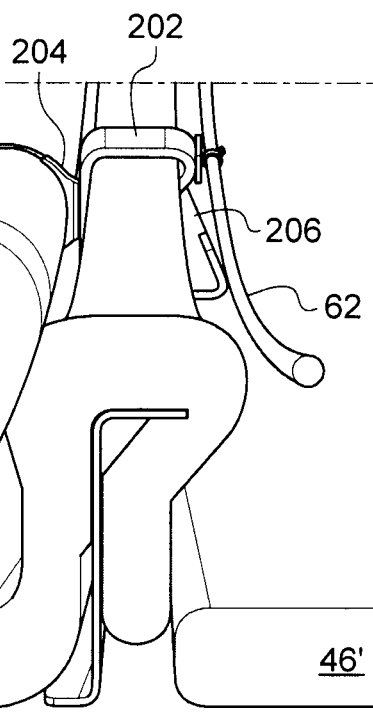
Figure 17:
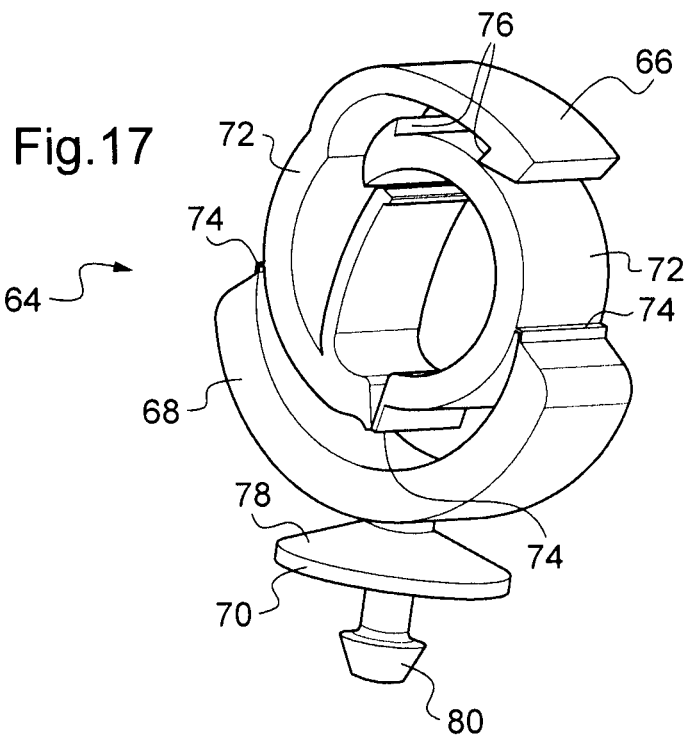
Figure 18:
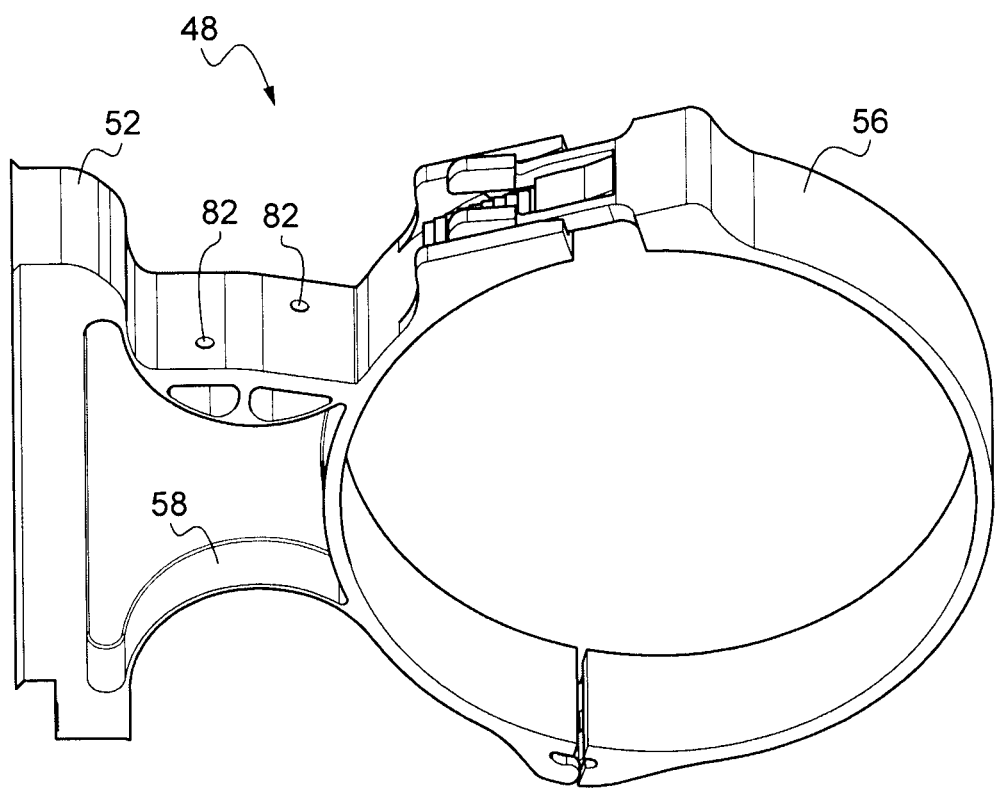

Details and advantages of this invention will become more apparent from the description that follows, presented with reference to the attached schematic drawings on which:

FIG. 1 shows a central part of a device according to the invention without a systems support, FIG. 2 is a side view of the part from FIG. 1, FIG. 3 shows a device corresponding to the central part from FIGS. 1 and 2 in position in an aircraft, FIG. 4 shows a structure in an aircraft intended to accommodate a holding device according to this invention, FIGS. 5 and 6 show the device from FIG. 3 positioned in relation to the structure shown on FIG. 4, FIG. 7 is a view similar to FIG. 1 for a first embodiment variant of a holding device according to this invention, FIG. 8 shows a second embodiment variant of a holding device according to the invention, mounted on a frame of the structure from FIG. 4 in a first perspective view, FIG. 9 shows elements from FIG. 8 from another angle, FIG. 10 is a perspective view of a central part of a fourth embodiment of a holding device according to this invention, FIG. 11 shows the central part from FIG. 10 from another angle, FIG. 12 shows the central part from FIGS. 10 and 11 equipped with supports and thus forming a device according to the invention, FIG. 13 is a view similar to FIG. 12, with an additional holding support plate, FIG. 14 shows the device from FIG. 13 in its environment, FIG. 15 shows a first support able to be mounted on a holding device according to this invention, FIG. 16 shows another type of support able to be mounted on a holding device according to this invention, FIG. 17 shows a third type of support able to be mounted on a holding device according to this invention, and FIG. 18 shows a fourth type of support able to be mounted on a holding device according to this invention.

FIGS. 1 and 2 show a stirrup-shaped part comprising a base 2 from which two arms extend.

It will be assumed arbitrarily that base 2 extends more or less in a vertical plane and that the arms are disposed so that one has an upper arm 4 and a lower arm 6.

Base 2 has an inner face 8 and an outer face 10. Inner face 8, disposed between upper arm 4 and lower arm 6, is in the form of a tape forming a wave 12 between two recesses 14.

Outer face 10 of base 2 is more or less plane (and vertical). It extends over all or part of the height of base 2.

The part shown on FIGS. 1 and 2 is made, for example, of molded synthetic material and the space between inner face 8 and outer face 10 is filled, for example, with this synthetic material. As a variant, one could have a hollow part, the connection between inner face 8 and outer face 10 then being implemented with the aid of side walls.

Upper arm 4 forms only a single part with base 2. It is assumed that it extends in a horizontal plane, perpendicular to outer face 10 of base 2. This upper arm 4 is more or less plane and ends at its free end with a return oriented toward the inside of the part (that is to say between the two arms thereof) and directed toward base 2, so as to form a first hook 16.

Lower arm 6 itself also extends in a more or less horizontal plane, perpendicular to outer face 10 of base 2. In addition, it also has a second hook 18 curved toward base 2 inside the part.

Lower arm 6, and more precisely second hook 18, is extended by a U-shaped part having two more or less parallel branches. The presence of a relatively short first branch 20 and of a second branch 22 considerably longer than first branch 20 is seen on the Figures. The base of the U-shaped part is formed by the median zone of second hook 18. As is apparent from the Figures, first branch 20 and second branch 22 extend from second hook 18 moving away from base 2. The space between first branch 20 and second branch 22 forms a housing 24. Second branch 22 extends parallel to first branch 20 in a vertical plane more or less perpendicular to outer face 10 of base 2 and bears a more or less horizontal plate 26 at its free end.

The part shown on FIGS. 1 and 2 is intended to be equipped with supports, as illustrated on FIGS. 3, 5 and 6, to allow fastening of systems onto a structure such as that shown on FIG. 4. FIG. 3 illustrates an assembly integrating the structure shown on FIG. 4, insulating blankets and a device for holding an insulating blanket and for fastening systems according to this invention and comprising the part shown on FIGS. 1 and 2.

The structure shown on FIG. 4 has a frame 28 onto which a skin 30 is fastened with the aid of parts called stabilizers 32. Each stabilizer has a part forming bracket 34 to make it possible to connect skin 30 to frame 28 and a rib 36 which extends perpendicular to the two faces of bracket 34 and which thus makes it possible to make the connection between frame 28 and skin 30 rigid.

It is seen on FIG. 4 that frame 28 is Z-shaped. Reverting to the orientation defined above, frame 28 thus has an upper flange 38, a core 40 and a lower flange 42. Frame 28 is a sectional piece with the shape of an arc of a circle. In a first approximation, it is assumed here, however, that it is a rectilinear sectional piece. In this approximation, it then is assumed that core 40 extends in a vertical plane (parallel to outer face 10) and that, as to flanges 38 and 42, they extend perpendicular to core 40 in a horizontal plane. As may be seen on the drawings, upper flange 38 extends on one side of core 40 while lower flange 42 extends on the other side of the core.

FIGS. 5 and 6 show how the device according to the invention is positioned in relation to the structure shown on FIG. 4. Upper arm 4 passes over upper flange 38 and first hook 16 comes around the free edge of upper flange 38 of frame 28. At the lower level, lower flange 42 of frame 28 comes to be accommodated in a recess 14 of inner face 8 of base 2.

As may be seen on FIG. 3, an insulating blanket called frame blanket 44 is disposed around frame 28, between the latter and the part shown on FIGS. 1 and 2. By virtue of the elasticity of this part, frame blanket 44 is firmly held on frame 28. The part from FIGS. 1 and 2 brings about a clamping at first hook 16 and wave 12. As to the free end of second hook 18, it comes to bear on a face of core 40, close to lower flange 42.

The presence of insulating blankets against outer skin 30 also is seen on FIG. 3. These insulating blankets are in the form of strips extending between two frames 28 in each instance. Each of these blankets is called skin blanket 46. To ensure a good continuity in the insulation, frame blanket 44 is fastened to each of skin blankets 46 situated on both sides of frame 28. A hook-and-loop connection system, better known under the trade name Velcro, may be provided here.

As may be seen on FIGS. 3, 5 and 6, the part shown on FIGS. 1 and 2 bears systems supports. Thus, outer face 10 of base 2 bears a first conduit support 48 such as that shown on FIG. 18. Mounting of first conduit support 48 is implemented on base 2 by a mortise-and-tenon type fastening. As may be seen in particular on FIG. 1, outer face 10 comprises a groove 50 in which a foot 52 with shape complementary to first conduit support 48 comes to slide. It is provided that foot 52 can enter groove 50 via only one side and that when foot 52 slides into groove 50 and reaches end of travel, locking means make it possible to hold first conduit support 48 on base 2. A tongue piece 54 provided on base 2 serves for unlocking the said locking means.

First conduit support 48 further comprises a collar 56 mounted on a base 58 forming only a single part with foot 52. Collar 52 is of a size adapted for accommodating an air duct 60 as illustrated on FIG. 3.

Electrical conduits 62 also may be fastened in relation to the structure shown on FIG. 4 with a device according to this invention. In the embodiment shown, second conduit supports 64 are provided. Such a second conduit support 64 comprises a base 68 topping a foot 70 and itself bearing two jaws 72.

Base 68 has the shape of a curved band. Each of its two ends forms a hinge 74 onto which a jaw 72 is jointed so as to be able to pivot in relation to base 68. Each of jaws 72 also has the overall shape of a curved band. The two jaws 72 are connected with one another by a third hinge 74.

Second conduit support 64 is shown on FIG. 17 in closed position. In open position, jaws 72 are pivoted approximately 90° outward in relation to the position shown on this FIG. 16 and thus form a W. When an electrical conduit 62 comes to rest at the center of this W, jaws 72 again close to come into the position shown on FIG. 16 and grip corresponding electrical conduit 62. It may be seen that by virtue of the presence of an outer tongue piece 66 and a set of hooks 76, second conduit support 64 is locked in closed position, preventing any unintentional displacement of electrical conduit 62 out of the housing provided on second conduit support 64.

Foot 70 of second conduit support 64 comprises a circular support plate 78 from which there extends, on the side opposite base 68, a rod having a truncated head 80. This is made of an elastic material such as rubber or a similar synthetic material. Its vertex forms a circle with diameter smaller than the diameter of bores 82 formed on the one hand on base 58 and on the other hand on plate 26. As to the base of truncated head 80, it forms a circle with diameter larger than the diameter of bores 82.

In that way, truncated head 80 may be inserted through a bore 82, but once the base of this truncated head 80 has gone through said bore 82, it becomes difficult to withdraw it in the other direction, the periphery of the base of truncated head 80 coming to rest flat around corresponding bore 82.

The position of the device for holding an insulating blanket and for fastening systems described above is indexed by virtue of the presence of the U-shaped part and corresponding housing 24. This housing is adapted for accommodating a rib 36 of a stabilizer 32.

The device for holding an insulating blanket and for fastening systems described above makes it possible, with a single device, to fasten systems on two sides of the same frame. In fact, it is seen that a part of the device passes underneath the frame to allow fastening systems on the other side of the frame. As may be seen on FIG. 3, at the site of this "crossing" of frames, frame blanket 44 is adapted so as to make it possible to achieve a good insulation at second branch 22.

FIG. 7 illustrates an embodiment variant in which the said frame "crossing" is not implemented. The part shown on FIG. 7 corresponds to the part shown on FIGS. 1 and 2. The only difference here is found at second branch 22. Here, instead of second branch 22 from FIGS. 1 and 2, one has a second branch 22" identical to first branch 20. The U-shaped part at second hook 18 here also forms a housing 24 that serves for indexing of the device when the latter is mounted on a frame.

FIGS. 8 and 9 illustrate a third embodiment of a device for holding a blanket and for fastening systems according to this invention. In this embodiment variant, indexing of the position of the device on the structure shown on FIG. 4 no longer is accomplished in relation to a rib 36 of a stabilizer 32, but in relation to a bracket 34 of such a stabilizer 32.

The structure of this new embodiment is close to that of the embodiment described above and to its variant.

For this new embodiment, there thus again are found in particular a base 102 and an upper arm 104. It is assumed here that the device is oriented in the same manner as above. Base 102 therefore extends in a more or less vertical plane, while, as to upper arm 104, it extends more or less horizontally. Base 102 here also has an inner face 108 and an outer face 110. In this embodiment variant, there also again is found an inner face forming a wave 112 disposed between two recesses 114. A difference here is that inner face 108 is of limited width on the upper arm 104 side in relation to the lower end of inner face 108. The latter has a lower edge 184. From each of the ends of this lower edge 184, a lower arm 106 extends in each instance. Each lower arm 106 has a horizontal part extending from base 102 and has a second hook 118 at its free end. In this way a housing 124 is defined between the two lower arms 106.

The two lower arms 106 and lower edge 184 form a U-shaped part, the two arms 106 extending parallel. The distance between the two lower arms 106 is adapted for accommodating a bracket 34 of a stabilizer 32.

Outer face 110 itself also has a groove 150 similar in every respect to groove 50 of the embodiment from FIGS. 1 and 2. This groove 150 is intended to cooperate with first conduit support 48 shown on FIG. 18. Similar locking means as well as an unlocking tongue piece 154 are found again here. On FIGS. 8 and 9, there has been shown a third conduit support 186 that comes to cooperate with outer face 110 of base 102 in exactly the same manner as first conduit support 48. This third conduit support 186 therefore comprises a foot 152 similar in every respect to foot 52 described above. This foot 152 bears a collar 156 by way of a base 158. In the embodiment shown on FIGS. 8 and 9, base 158 does not have bores such as bores 82 implemented on base 58. An embodiment variant, however, could provide for such bores or other means for accommodating a system support.

Here, in this embodiment, collar 156 of third conduit support 186 is provided for fastening an air duct. At its outer periphery, collar 156 has two housings 188 each intended to accommodate an electrical conduit, such as electrical conduits 62 shown on FIG. 3.

The device for holding a blanket and for fastening systems shown on FIGS. 8 and 9 may be used in an environment similar to the one shown on FIGS. 3 and 4. For the sake of clarity, the insulating blankets have not been shown on FIGS. 8 and 9. Here also, a frame blanket is intended to become positioned between frame blanket 38 and the device according to the invention shown on FIGS. 8 and 9. Here also, a holding of this blanket is accomplished by means of elasticity with the aid of first hook 116 mounted at the free end of upper arm 104 and by bearing of wave 112 which comes to clip the frame blanket against core 40 of frame 38. The free end of lower arms 106 each forms a second hook 118 which comes to bear on core 40 of frame 38. Here, indexing of the device for holding a blanket and for fastening systems is accomplished by positioning the said device in relation to a bracket 34 of a stabilizer 32.

FIGS. 10 to 14 show another embodiment of a device for holding a blanket and for fastening systems according to this invention. In this embodiment, as in the preceding embodiments, there again is found a base from the ends of which two arms extend. In this embodiment, a base 202 thus is found again. Reverting to the same orientation as above, in this embodiment it then should be considered that base 202 here extends in a horizontal plane. Moreover, base 202 is disposed in a higher position in relation to the described device. Here there also is found again, as in the other embodiments described above, arms extending from the ends of the base of the device. In the embodiments described above, upper arms 4, 104 and lower arms 6, 106 were involved. In this embodiment, the arms extend along a more or less vertical direction. There then is a first arm 204 and a second arm 206.

First arm 204 is more or less plane. It has means allowing fastening of a support such as, for example, a fourth conduit support 290 shown on FIG. 15. On its outer face, that is to say its face opposite second arm 206, first arm 202 also comprises a groove 250 so as to be able to accommodate fourth conduit support 290 and be connected thereto by a mortise-and-tenon type connection. As may be seen in particular on FIG. 10, first arm 204 also bears, on both sides of groove 250, tongue pieces 292 making it possible to bring about a locking of fourth conduit support 290 in groove 250. It is seen on FIG. 14 that, as to fourth conduit support 290, it has a rib 294 with shape complementary to that of groove 250 as well as stops 296 intended to cooperate with tongue pieces 292 so as to bring about a locking of fourth conduit support 290 on first arm 204. As is apparent from FIG. 15, the fourth conduit support comprises a collar 256 intended to accommodate an air duct.

Second arm 206 has a more complex shape than first arm 204. In a side view, the space between first arm 204 and second arm 206 forms an L, the base of the L being disposed against base 202. Starting from base 202, second arm 206 is therefore first of all relatively far away from first arm 204, then draws closer thereto. Second arm 206 comprises a plane part 298 which corresponds to the close part of first arm 204. The end of plane part 298, opposite base 202, bears a flange 300 that extends from plane part 298 parallel to base 202 moving away from first arm 204. A side wall 302 extends in a plane perpendicular to plane part 298 and to flange 300, connecting said plane part 298 and said flange 300.

There is seen (FIG. 12) on side wall 302 the presence of a wall 304 parallel to said side wall 302 and connected to the latter by a connecting part 306 extending perpendicular to side wall 302 and to parallel wall 304.

On both sides of parallel wall 304 there extends, in each instance, a rod 308 that extends from side wall 302 and perpendicular thereto. As may be seen on FIG. 13, these toothed rods 308 are intended to accommodate a support plate 310 which, in mounted position, extends parallel to side wall 302. For a better holding of support plate 310, there is provided on connecting part 306 a small guiding rail 312 that comes to cooperate with a groove made in a projection 314 extending from one face of support plate 310.

As indicated above, the device shown on FIGS. 10 to 14 can accommodate a support such as fourth conduit support 290 shown on FIG. 15, same then being mounted on first arm 204. It also is seen on FIGS. 12 and 13 that this device bears a fifth conduit support 316, which is shown in greater detail on FIG. 16. This fifth conduit support 315 is intended more particularly for fastening of an electrical conduit. For the mounting of this fifth support 316, a groove 318 is made on the outer face of second arm 206, in immediate proximity to base 202. Fifth conduit support 316 has a foot 320 bearing a sectional rail 322 with section complementary to that of groove 318. As is apparent from FIGS. 11 and 16, locking means also are provided to make it possible to guarantee a good holding of fifth conduit support 316 in groove 318.

For mounting of the device, first arm 204 and second arm 206 are moved away from one another so as to come to overlap a frame 28. As indicated above, the space between first arm 204 and second arm 206 has an L shape and in this way is adapted for accommodating on the one hand core 40 of frame 28 (between first arm 204 and second arm 206) and on the other hand upper flange 38 of said frame 28 (close to base 202). By means of elasticity, the described device then comes to hold a frame blanket covering frame 28.

FIG. 14 proposes an original mounting in which there no longer is a frame blanket 44 but only skin blankets 46'. Skin blanket 46' is extended on one side to cover a frame 28. A connection between two blankets thus is avoided. In fact, it suffices to provide a connection between two successive skin blankets 46'. The devices for holding an insulating blanket and for fastening systems shown on FIGS. 10 to 13 allow such a mounting without a frame blanket.

The device described above, when it is installed on frame 28, is placed so that a rib 36 of a stabilizer 32 comes to be positioned in the housing situated between side wall 302 and parallel wall 304. In that way, the position of the device for holding an insulating blanket and for fastening systems is indexed in relation to frame 28. Since skin blanket 46' also comes to cover rib 36 of stabilizer 32, support plate 310 comes to contribute to a better holding of the said blanket on the structure. This support plate 310 also allows a better fastening of the device onto the structure.

The various devices described above therefore allow holding of an insulating blanket on a frame as well as fastening of systems in relation to the structure of an aircraft.

An advantage of all these devices is that they may be adapted easily in particular as regards fastening of systems. In fact, to the individual skilled in the art, the devices described will appear to be adjustable. For example, an electrical-conduit support may be arranged instead of an air-duct support. It also is possible to adapt the number of conduit/duct supports borne by the device. Moreover, it is seen that the devices described above make it possible to adapt to many solutions for the passing through of supported systems and may support all types of systems, because it suffices to adapt the supports mounted on the arms and/or the branches to the systems to be fastened.

The devices according to this invention also have the great advantage of being able to provide supporting of cables and ducts/conduits without having to make holes in or modify the structure of the aircraft. Moreover, except for the first embodiment shown on FIGS. 1 to 6, it is not necessary to adapt the insulating blankets for installation and mounting of the devices according to this invention.

Mounting of these various devices may be accomplished without tools, or at least without specific tools. These devices also are designed for being able to be easily remounted and dismantled in the same position as prior to dismantling.

Finally, the devices according to this invention are easy and quick to implement. Mounting (and dismantling) time is limited. In addition, if the devices according to the invention are made of synthetic material, it is possible to have devices with reduced weight, which of course is advantageous for a mounting in an aircraft.

This invention is not limited to the embodiments described above by way of non-limitative examples, or to the indicated variants. It also relates to all the embodiment variants within the capacity of the individual skilled in the art in the context of the claims below.

The invention claimed is:

1. A system for holding at least one insulating blanket and for fastening systems in an aircraft, comprising:
   a base with two ends, and
   two arms, with an arm extending from each end, wherein the base and the arms form a hook to fit over at least one frame of a fuselage of the aircraft covered with the at least one insulating blanket, wherein at least one of the two arms has a U-shaped part with two essentially parallel branches configured to accommodate a wall of a stabilizer of the fuselage, wherein the hook is a single part having a shape and an elasticity to fit the system on the frame covered with the at least one insulating blanket, and to hold the system and the at least one insulating blanket on the frame, wherein an arm of the system passes over a flange of the at least one frame and holds the at least one insulating blanket onto the at least one frame, and wherein the system further includes at least one support for accommodating a second system.

2. The system according to claim 1, wherein the base has an elongated shape and defines a plane, referred to as reference plane, and the arms extend substantially perpendicular to the reference plane.

3. The system according to claim 1, wherein at least one support is a separate part equipped with assembly means, and at least one of the base and at least one arm comprises complementary assembly means making it possible to accommodate the support.

4. The system according to claim 3, wherein the assembly means and the complementary assembly means allow an assembly and a reversible locking by means of elastic deformation.

5. The system according to claim 1, wherein the at least one frame comprises a core, an upper flange, and a lower flange.

6. The system according to claim 5, wherein an upper arm of the system passes over the upper flange of the at least one frame and holds the at least one insulating blanket onto the at least one frame.

7. The system according to claim 6, wherein an inner face of the base abuts the lower flange of the frame, and a lower arm of the system abuts a face of the core of the frame, near the lower flange of the frame.

8. The system according to claim 1, wherein the base has an inner face configured to form a wave between two recesses, and at least one arm has a first hook at a free end, such that the wave and the first hook clamp the system to the at least one frame.

9. An aircraft fuselage section comprising the system according to claim 1, wherein the outer skin is fastened onto the at least one frame with fastening parts referred to as stabilizers, wherein the at least one frame is situated between the arms of the system, and the insulating blanket is situated between the frame and the system, and wherein the branches of the U-shaped part are disposed on both sides of a wall of a stabilizer.

10. The aircraft fuselage section according to claim 9, wherein the base has an elongated shape and defines a plane, referred to as reference plane, and the arms of the system extend more or less perpendicular to the reference plane.

11. The aircraft fuselage section according to claim 9, wherein the base, the arms and the U-shaped part of the system form only a single part.

12. The aircraft fuselage section according to claim 9, wherein at least one support is a separate part equipped with assembly means, and the base and/or at least one arm of the system comprises complementary assembly means to accommodate the support.

13. The aircraft fuselage section according to claim 12, the assembly means and the complementary assembly means allow an assembly and a reversible locking by means of elastic deformation.

14. The aircraft fuselage section according to claim 9, wherein the at least one insulating blanket covers a surface portion of the outer skin and, at least partially, a section of frame.

15. The aircraft fuselage section according to claim 9, wherein the at least one insulating blanket is connected to an adjoining insulating blanket with the aid of a hook-and-loop system.

16. An aircraft, comprising at least one fuselage section according to claim 9.

* * * * *

UNITED STATES PATENT AND TRADEMARK OFFICE
CERTIFICATE OF CORRECTION

PATENT NO. : 8,622,348 B2  
APPLICATION NO. : 13/165446  
DATED : January 7, 2014  
INVENTOR(S) : Lionel Sabadie et al.

Page 1 of 1

It is certified that error appears in the above-identified patent and that said Letters Patent is hereby corrected as shown below:

On the title page, Item (54) and in the Specification, Column 1, the Title is incorrect. Item (54) and Column 1 should read:

--DEVICE FOR HOLDING AN INSULATING BLANKET AND FOR FASTENING SYSTEMS--

Signed and Sealed this
Eighth Day of April, 2014

Michelle K. Lee
*Deputy Director of the United States Patent and Trademark Office*